(12) United States Patent
Schott et al.

(10) Patent No.: US 8,416,522 B1
(45) Date of Patent: Apr. 9, 2013

(54) DISK DRIVE WITH STEPPED MOTOR HUB

(75) Inventors: Brian P. Schott, San Jose, CA (US); Nils E. Larson, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 897 days.

(21) Appl. No.: 12/243,788

(22) Filed: Oct. 1, 2008

(51) Int. Cl.
*G11B 17/02* (2006.01)

(52) U.S. Cl. .................. 360/99.08; 360/98.08

(58) Field of Classification Search ............. 360/98.08, 360/99.08, 99.12
See application file for complete search history.

(56) References Cited

U.S. PATENT DOCUMENTS

| | | | |
|---|---|---|---|
| 5,031,061 A | 7/1991 | Hatch | |
| 5,592,349 A * | 1/1997 | Morehouse et al. | 360/98.08 |
| 5,982,581 A | 11/1999 | Kazmierczak et al. | |
| 6,208,486 B1 | 3/2001 | Gustafson et al. | |
| 6,417,991 B1 | 7/2002 | Onda | |
| 6,563,668 B1 * | 5/2003 | Suwito | 360/98.08 |
| 6,636,380 B2 * | 10/2003 | Goeke et al. | 360/98.08 |
| 6,754,042 B1 | 6/2004 | Chiou et al. | |
| 6,888,698 B1 | 5/2005 | Berding et al. | |
| 7,371,041 B2 * | 5/2008 | Pfeiffer et al. | 414/795.2 |
| 7,826,173 B2 * | 11/2010 | Lee | 360/98.08 |
| 8,077,432 B2 | 12/2011 | Hanlon et al. | |
| 2005/0185329 A1 * | 8/2005 | Miyajima et al. | 360/99.08 |
| 2005/0185330 A1 * | 8/2005 | Lee et al. | 360/99.12 |

\* cited by examiner

*Primary Examiner* — Angel A. Castro

(57) ABSTRACT

A disk drive motor hub includes a top cylindrical portion defining a longitudinal axis, a middle cylindrical portion proximate the top cylindrical portion, and a bottom cylindrical portion proximate the middle cylindrical portion. The middle cylindrical portion defines an upper mounting surface substantially normal to the longitudinal axis, the upper mounting surface extending radially beyond the top cylindrical portion, and the bottom cylindrical portion defines a lower mounting surface substantially normal to the longitudinal axis, the lower mounting surface extending radially beyond the middle cylindrical portion.

18 Claims, 11 Drawing Sheets

DISK DRIVE WITH STEPPED MOTOR HUB

BACKGROUND

Disk drives typically include a spindle motor for rotating one or more disks in order to read data from and write data to surfaces of the disks. The spindle motor includes a stator having a plurality of coils, and a rotor having one or more rotor magnets and a rotating motor hub on which the disks may be mounted and clamped. Different coils of the stator are alternately energized to form a changing electromagnetic field that pulls/pushes the rotor magnets, thereby rotating the motor hub. Rotation of the motor hub, in turn, results in rotation of the disks mounted thereto.

Disks used in different disk drive platforms may have a variety of different dimensions. In fact, even two disk drive platforms having the same form factor (e.g., 3.5", 2.5", 1", etc.) may utilize disks with different dimensions in order to meet application specific requirements. As a result, in conventional disk drive manufacturing processes, different components are used in each disk drive platform in order to accommodate the particular dimensions of their respective disks. Unfortunately, significant engineering resources are therefore expended to create new components, such as spindle motors and motor hubs, which perform very similar tasks, albeit for disks of varying dimensions.

There is therefore a need for an improved disk drive motor hub.

DETAILED DESCRIPTION

Figure 1:
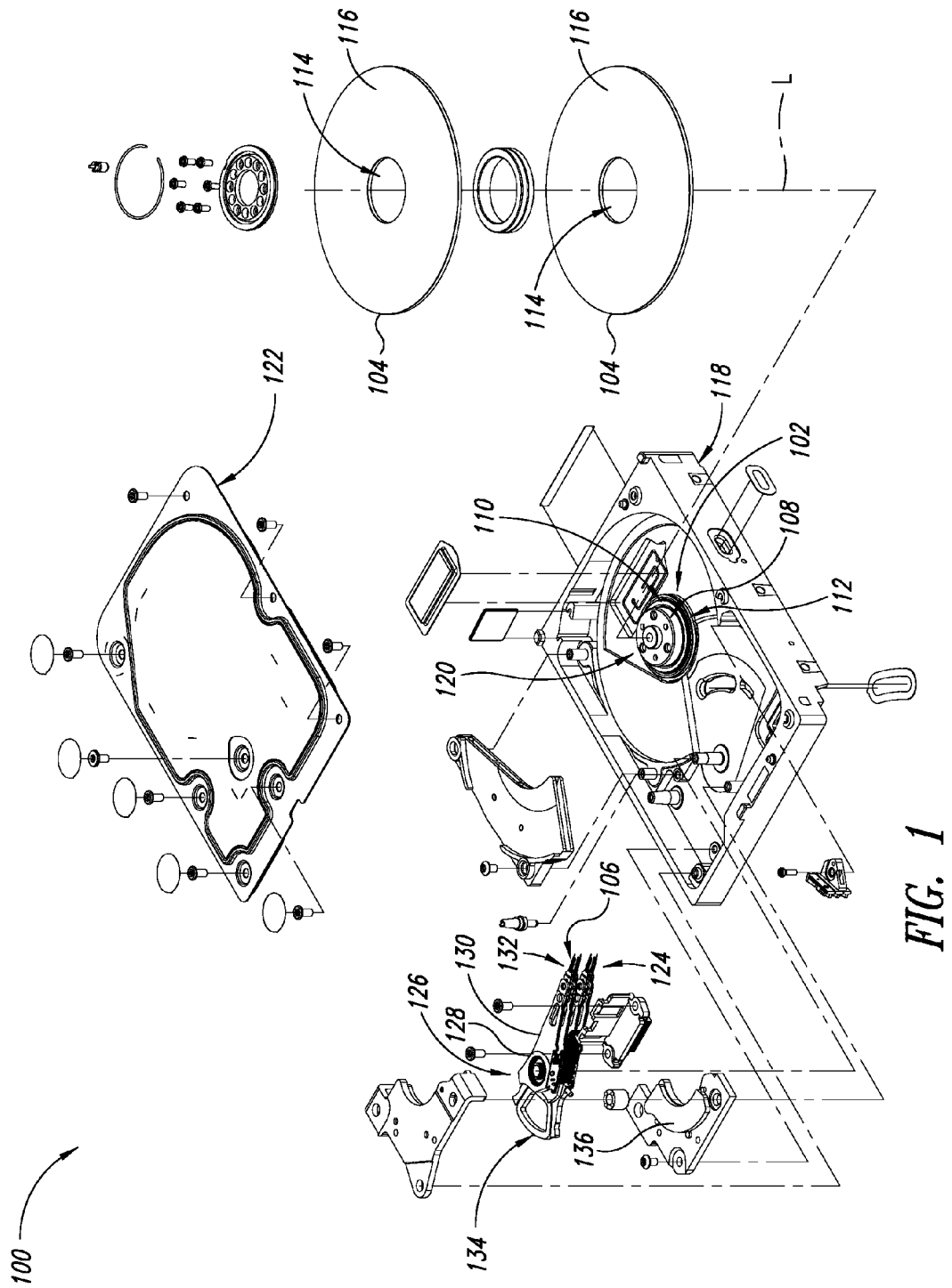
FIG. 1 is an exploded, perspective view generally illustrating a disk drive including an exemplary motor hub, according to one illustrated embodiment.

Referring to FIG. 1, a disk drive 100 is illustrated, according to one embodiment. The disk drive 100 comprises a motor hub 102, a disk 104 physically contacting and supported by at least one mounting surface of the motor hub 102, and a head 106 operable to write to and read from the disk 104. In one embodiment, the motor hub 102 comprises a top cylindrical portion 108 defining a longitudinal axis L, and a middle cylindrical portion 110 proximate the top cylindrical portion 108, the middle cylindrical portion 110 defining an upper mounting surface substantially normal to the longitudinal axis L, the upper mounting surface extending radially beyond the top cylindrical portion 108. The motor hub 102 may further comprise a bottom cylindrical portion 112 proximate the middle cylindrical portion 110, the bottom cylindrical portion 112 defining a lower mounting surface substantially normal to the longitudinal axis L, the lower mounting surface extending radially beyond the middle cylindrical portion 110.

As illustrated herein, the disk drive 100 comprises a magnetic disk drive, and the structures and methods described herein will be described in terms of such a disk drive. However, these structures and methods may also be applied to and/or implemented in other disk drives, including, e.g., optical and magneto-optical disk drives.

The disks 104 may comprise any of a variety of magnetic or optical disk media having a substantially concentric opening 114 defined therethrough. Of course, in other embodiments, the disk drive 100 may include more or fewer disks. The disks 104 each include a disk surface 116, as well as an opposing disk surface not visible in FIG. 1. In one embodiment, the disk surfaces 116 comprise a plurality of generally concentric tracks for storing data.

As illustrated, the motor hub 102 may be coupled to and support the disks 104. The motor hub 102 may also be rotatably attached to a disk drive base 118 of the disk drive 100, and may form one component of a motor 120 (e.g., a spindle motor). The motor 120 and the motor hub 102 may be configured to rotate the disks 104 about the longitudinal axis L. As discussed in greater detail below, the motor hub 102 comprises a plurality of cylindrical portions 108, 110, 112, which define at least two mounting surfaces. In one embodiment, the longitudinal axis L may run through a center of at least the top cylindrical portion 108.

The disk drive 100 may further include a cover 122, which, together with the disk drive base 118, may house the disks 104 and the motor 120. The disk drive 100 may also include a head stack assembly ("HSA") 124 rotatably attached to the disk drive base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding disk 104. The HSA 124 may further include a coil 134 through which a changing electrical current is passed during operation. The coil 134 interacts with one or more magnets 136 that are attached to the disk drive base 118 to form a voice coil motor ("VCM") for controllably rotating the HSA 124.

The head 106 may comprise any of a variety of heads for writing to and reading from a disk 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on to an adjacent disk surface.

The disk drive 100 may further include a printed circuit board ("PCB") (not shown). The PCB may include, inter alia, a disk drive controller for controlling read and write operations and a servo control system for generating servo control signals to position the actuator arms 130 relative to the disks 104.

Figure 2:
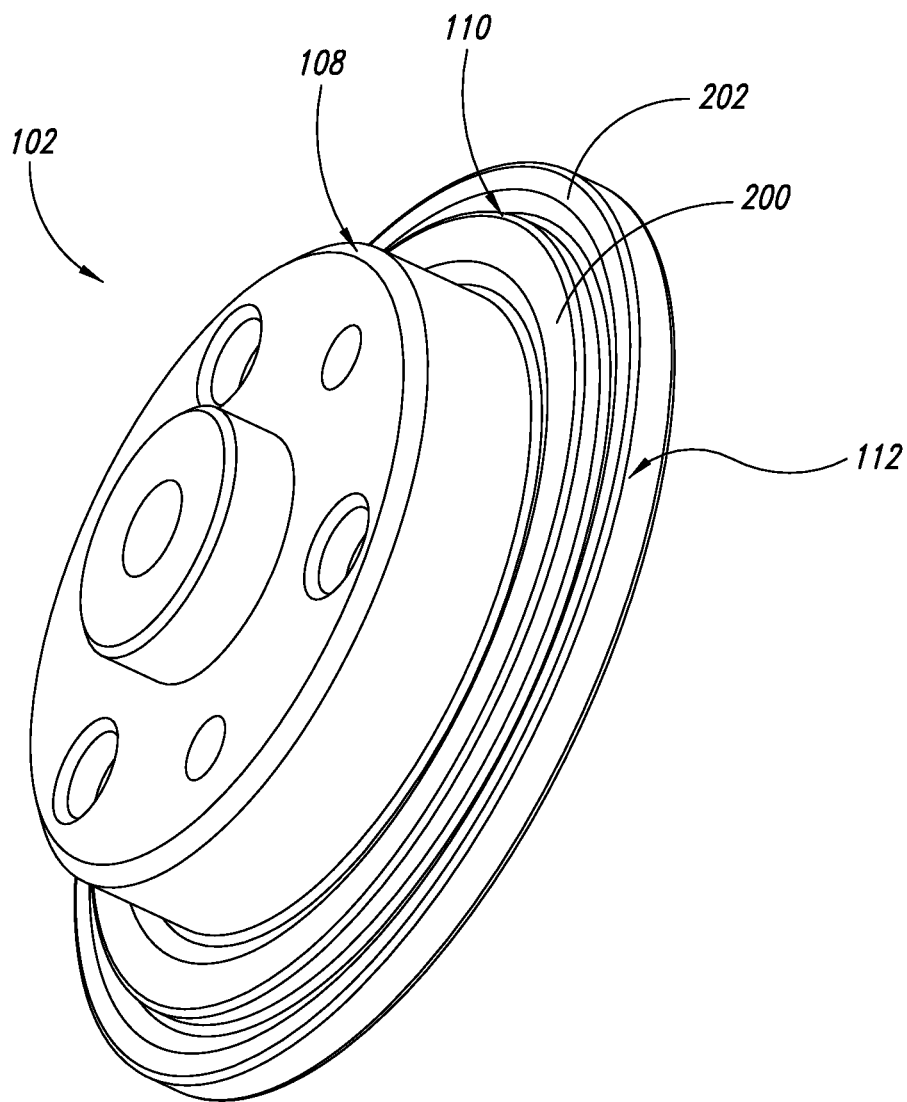
FIG. 2 is a perspective view illustrating the motor hub of FIG. 1, according to one illustrated embodiment.
Figure 3:
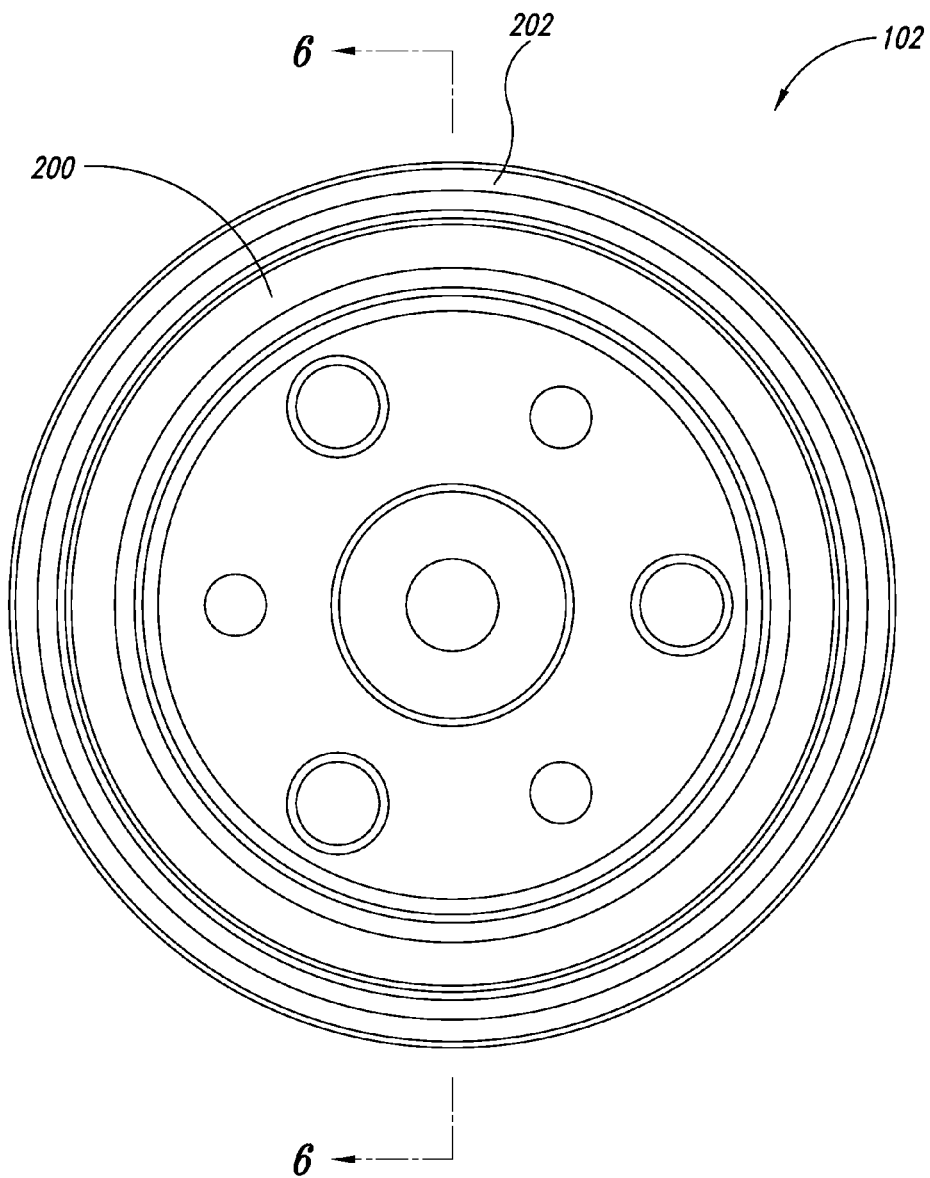
FIG. 3 is a top view illustrating the motor hub of FIG. 1, according to one illustrated embodiment.
Figure 4:
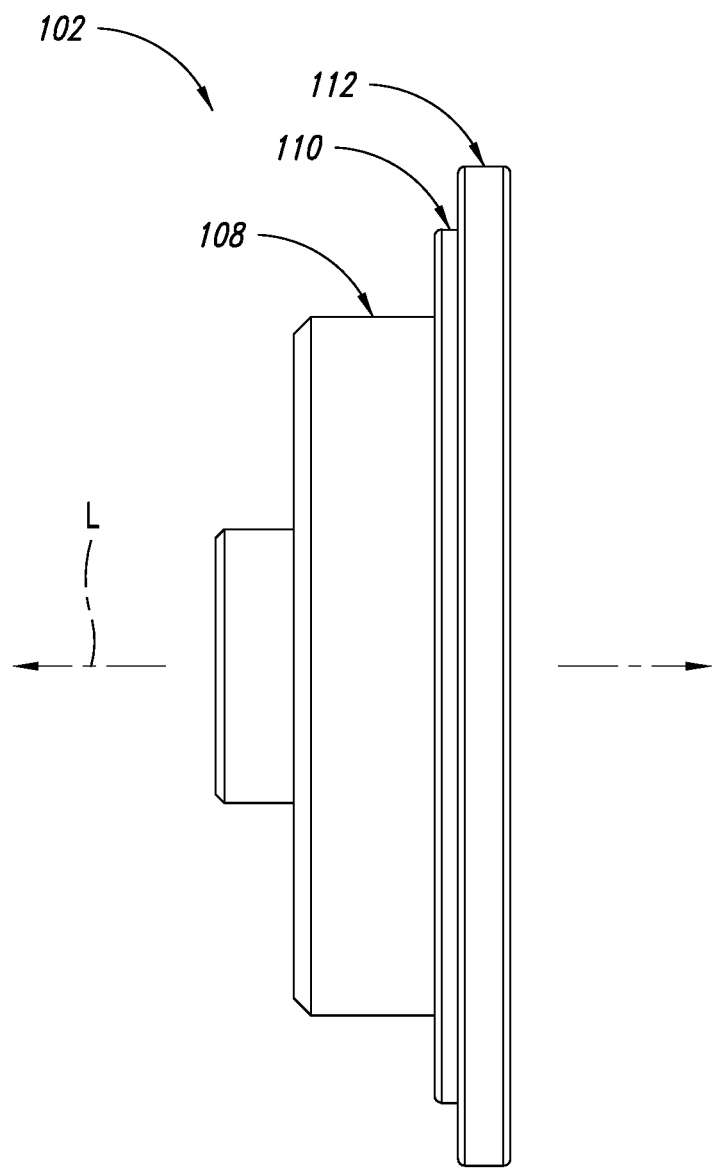
FIG. 4 is a side view of the motor hub of FIG. 1, according to one illustrated embodiment.
Figure 5:
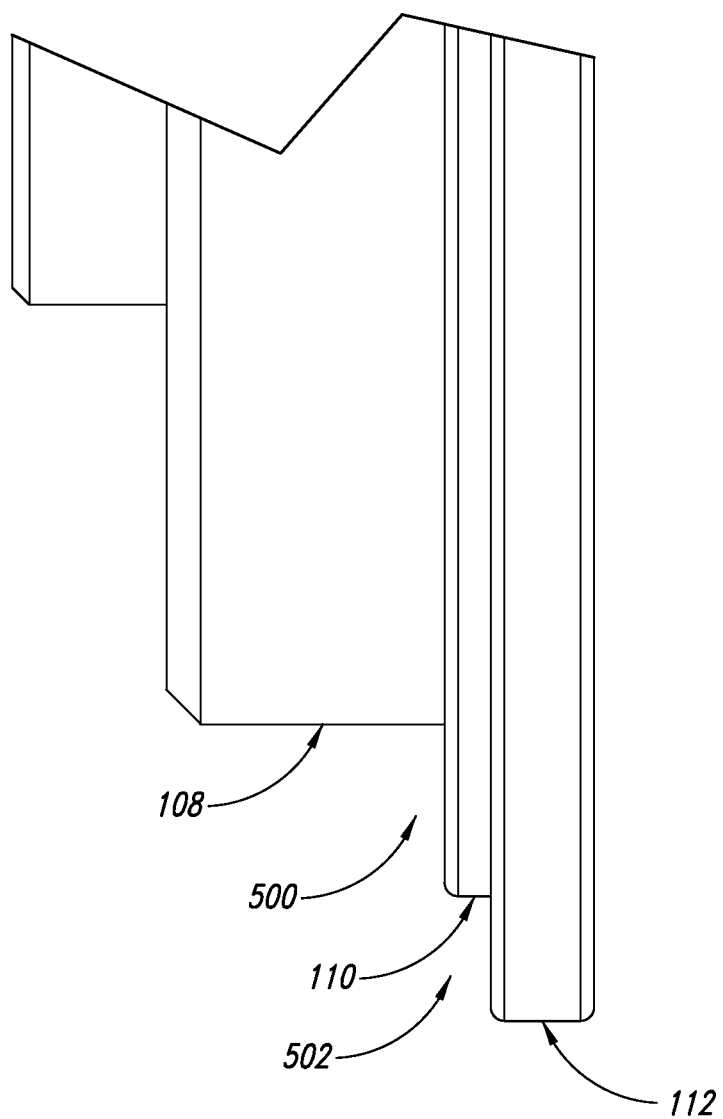
FIG. 5 is a magnified, side view of the motor hub of FIG. 1, according to one illustrated embodiment.
Figure 6:
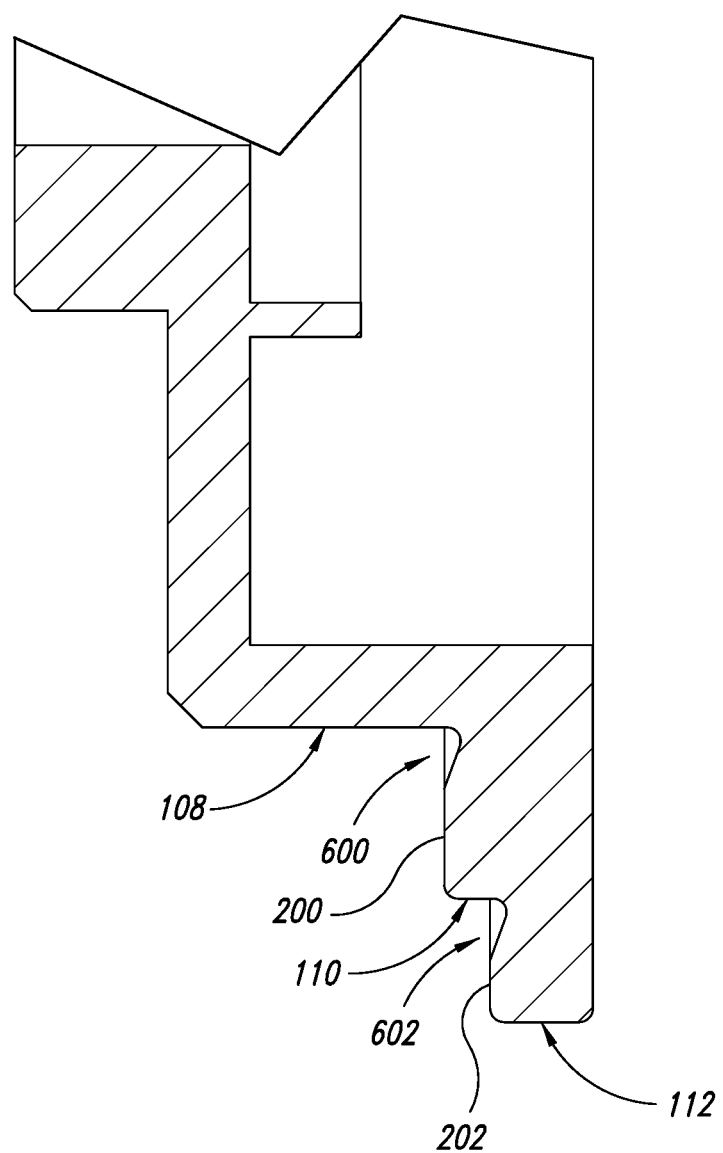
FIG. 6 is a magnified, cross-sectional, side view of the motor hub of FIG. 1, according to one illustrated embodiment.

FIGS. 2-6 show a number of views of the exemplary motor hub 102 separated from the disk drive 100. FIGS. 2-4 show perspective, top and side views, respectively, of the motor hub 102, and FIGS. 5 and 6 show a magnified, side view and a magnified, cross-sectional, side view of the motor hub 102, respectively.

As illustrated, the motor hub 102 comprises a top cylindrical portion 108 defining a longitudinal axis L; a middle cylindrical portion 110 proximate the top cylindrical portion 108, the middle cylindrical portion 110 defining an upper mounting surface 200 substantially normal to the longitudinal axis L, the upper mounting surface 200 extending radially beyond the top cylindrical portion 108; and a bottom cylindrical portion 112 proximate the middle cylindrical portion 110, the bottom cylindrical portion 112 defining a lower mounting surface 202 substantially normal to the longitudinal axis L, the lower mounting surface 202 extending radially beyond the middle cylindrical portion 110. In one embodiment, the middle cylindrical portion 110 may extend longitudinally relative to the lower mounting surface 202, and the top cylindrical portion 108 may extend longitudinally relative to the upper mounting surface 200.

The two mounting surfaces 200, 202 may provide alternative mounting surfaces upon which one or more disks may be mounted. In one embodiment, the upper mounting surface 200 may be configured to support a first magnetic disk having a first inner diameter. Indeed, an outer diameter of the top cylindrical portion 108 may be chosen to correspond generally to the first inner diameter of the first magnetic disk. In addition, the lower mounting surface 202 may be configured to support a second magnetic disk having a second inner diameter greater than the first inner diameter. An outer diameter of the middle cylindrical portion 110 may be chosen to correspond generally to the second inner diameter of the second magnetic disk. In some embodiments, motor hubs dimensioned identically to the motor hub 102 may thus be used with different disk drive platforms to support disks having different inner diameters.

The mounting surfaces 200, 202 may have a variety of different geometries and dimensions. In one embodiment, the mounting surfaces 200, 202 may be substantially flat to provide support for disks mounted thereto. However, in other embodiments, one or both of the mounting surfaces 200, 202 may be slightly tapered radially or otherwise contoured. For example, the mounting surfaces 200, 202 may be tapered in order to mitigate disk coning when disks are mounted to the mounting surfaces 200, 202. In one embodiment, the mounting surfaces 200, 202 may lie along planes substantially normal to the longitudinal axis L. As used herein, the phrase "substantially normal" may be understood to include slightly tapered or otherwise contoured surfaces that are not perfectly normal to the longitudinal axis L.

As illustrated, the upper mounting surface 200 may extend radially outward to proximate an outer diameter of the middle cylindrical portion 110. Similarly, the lower mounting surface 202 may extend radially outward to proximate an outer diameter of the lower cylindrical portion 112. However, in other embodiments, the mounting surfaces 200, 202 may have a different geometry and may have outer diameters that are substantially smaller than the outer diameters of their respective cylindrical portions 110, 112.

As best shown in FIG. 6, the upper mounting surface 200 may be separated from the top cylindrical portion 108 by a tapered section 600. Similarly, the lower mounting surface 202 may be separated from the middle cylindrical portion 110 by a tapered section 602. In other embodiments, different geometries may define the region between the top cylindrical portion 108 and the upper mounting surface 200 and/or the region between the middle cylindrical portion 110 and the lower mounting surface 202. In still other embodiments, the mounting surfaces 200, 202 may extend radially inward to substantially adjacent the top and middle cylindrical portions 108, 110, respectively.

The cylindrical portions 108, 110, 112 may also have any of a variety of geometries and dimensions. In one embodiment, a diameter of the top cylindrical portion 108 may be greater than or equal to approximately 20 mm. For example, the diameter of the top cylindrical portion 108 may be substantially equal to 20 mm in order to accommodate disks having an inner diameter of approximately 20 mm. A diameter of the middle cylindrical portion 110 may be greater than or equal to approximately 25 mm. For example, the diameter of the middle cylindrical portion 110 may be substantially equal to 25 mm in order to accommodate disks having an inner diameter of approximately 25 mm. The diameter of the bottom cylindrical portion 112 may be greater than or equal to approximately 30 mm. This dimension may be chosen to provide adequate support for the disks having the inner diameter of approximately 25 mm. Of course, in other embodiments, other dimensions for the cylindrical portions 108, 110, 112 may be selected, based on the particular disk drive platforms that might incorporate the motor hub 102.

In one embodiment, a height of the middle cylindrical portion 110 measured along the longitudinal axis L may be greater than or equal to 0.5 mm. The height may be chosen such that, if a disk is mounted on the upper mounting surface 200, at least a portion of an HGA may be dimensioned to fit between the mounted disk and the lower mounting surface 202. Thus, portions of the mounted disk aligned along the longitudinal axis L with the lower mounting surface 202 may be accessed using the HGA. In other embodiments, different heights may be used to accommodate differently sized HGAs. Moreover, in some embodiments, the middle cylindrical portion 110 may not be configured to enable an HGA to fit between a mounted disk and the lower mounting surface 202.

The motor hub 102 may be fabricated in a variety of ways from a variety of materials. In one embodiment, the motor hub 102 may be machined to form the cylindrical portions 108, 110, 112. For example, the cylindrical portions 108, 110, 112 may comprise integral parts machined from a unitary piece. In other embodiments, the cylindrical portions 108, 110, 112 may be formed separately and then coupled together during manufacturing. In one embodiment, the materials used to form the motor hub 102 may be chosen based at least in part upon the materials used to form the corresponding disks. For example, the motor hub 102 may comprise stainless steel when a glass disk substrate is used, and the motor hub 102 may comprise aluminum when an aluminum disk substrate is used. Of course, in other embodiments, different materials may be used in order to satisfy the needs of particular disk drive applications.

In one embodiment, as most clearly shown in FIG. 5, the motor hub 102 may also be understood to comprise a stepped cylindrical hub 102 defining a longitudinal axis L, the stepped cylindrical hub 102 including a first step 500 extending radially to define an upper mounting surface 200 normal to the longitudinal axis L, and a second step 502 extending radially beyond the first step 500 to define a lower mounting surface 202 normal to the longitudinal axis L. As described above, these steps 500, 502 may have any of a variety of dimensions and may define a plurality of cylindrical portions 110, 112.

In different embodiments, more cylindrical portions may also be defined by the motor hub 102 in order to support disks having still other inner diameters. For example, a motor hub 102 may include four or more cylindrical portions, which, in turn, may define three or more mounting surfaces for supporting disks of varying sizes.

Figure 7:
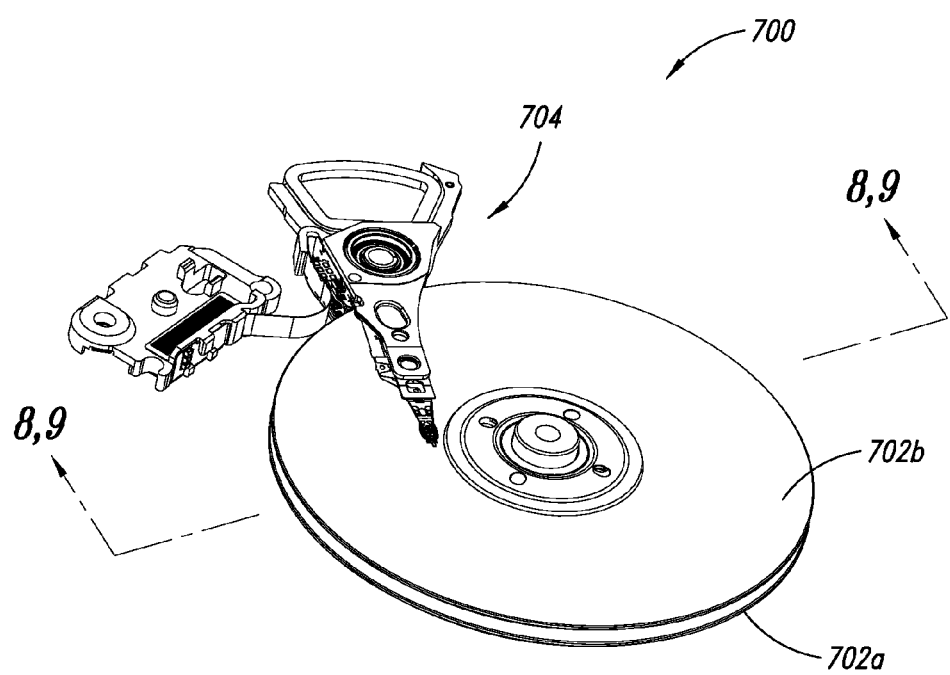
FIG. 7 is a perspective view of a partial disk drive including the motor hub of FIG. 1 and a head stack assembly, the motor hub having two disks supported by an upper mounting surface thereof, according to one illustrated embodiment.
Figure 8:
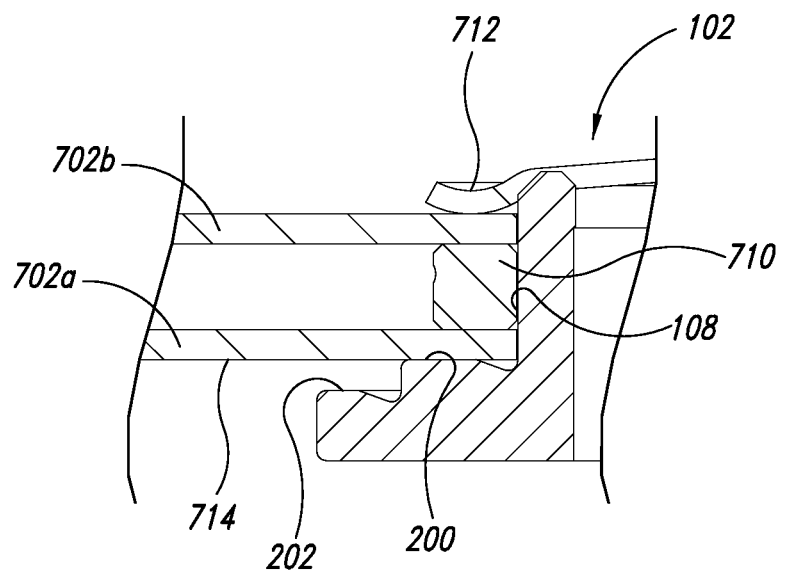
FIG. 8 is a magnified, cross-sectional, side view of the motor hub and disks of FIG. 7, according to one illustrated embodiment.
Figure 9:
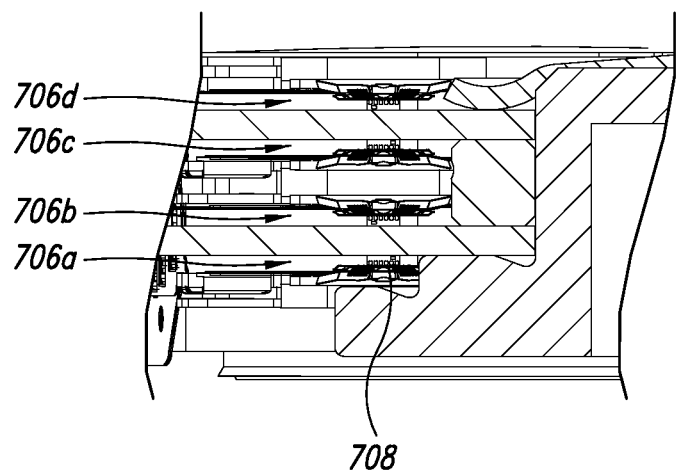
FIG. 9 is a magnified, cross-sectional, side view of the motor hub and disks of FIG. 7, including a plurality of head gimbal assemblies proximate the motor hub, according to one illustrated embodiment.

FIG. 7 shows a partial disk drive 700 including the motor hub 102 having two disks 702a, b (collectively 702) supported by the upper mounting surface 200, and an HSA 704. FIG. 8 is a magnified, cross-sectional, side view of the motor hub 102 and disks 702, with HGAs 706a-d (collectively 706) removed for clarity. FIG. 9 is a magnified, cross-sectional, side view of the motor hub 102 and disks 702 with the HGAs 706 positioned proximate to the motor hub 102. As illustrated, in one embodiment, the disk drive 700 may include the motor hub 102 and may further include a disk 702a physically contacting and supported by the upper mounting surface 200, and a head 708 operable to write to and read from the disk 702a.

In some embodiments, a plurality of disks 702 may be supported by the upper mounting surface 200. As illustrated, a disk spacer 710 may be incorporated into the disk drive 700 in order to properly separate proximately positioned disks 702, and a disk clamp 712 may be used to couple the disks 702 to the motor hub 102. As described above, at least a portion of the HGA 706a may be dimensioned to fit between a bottom surface 714 of the disk 702a and the lower mounting surface 202. In other embodiments, more or fewer disks 702 may be supported by the upper mounting surface 200. For example, a single disk may be supported by the upper mounting surface, and a taller disk spacer may be incorporated into the disk drive to take up the space that might otherwise be occupied by additional disks.

Figure 10:
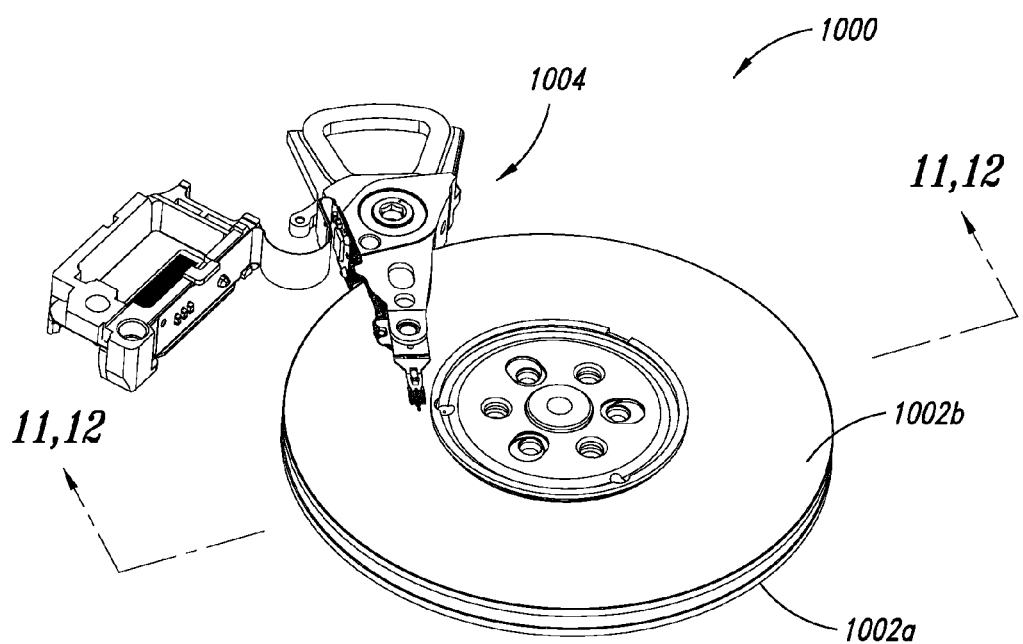
FIG. 10 is a perspective view of a partial disk drive including the motor hub of FIG. 1 and a head stack assembly, the motor hub having two disks supported by a lower mounting surface thereof, according to one illustrated embodiment.
Figure 11:
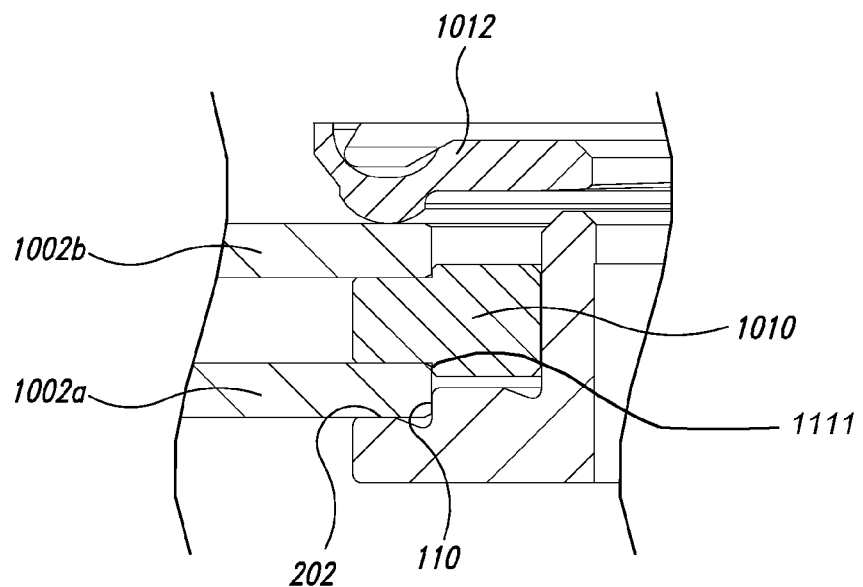
FIG. 11 is a magnified, cross-sectional, side view of the motor hub and disks of FIG. 10, according to one illustrated embodiment.
Figure 12:
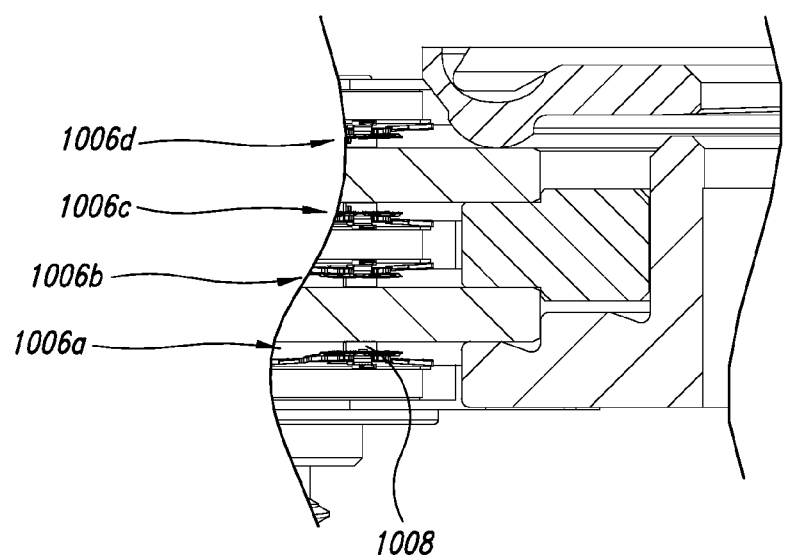
FIG. 12 is a magnified, cross-sectional, side view of the motor hub and disks of FIG. 10, including a plurality of head gimbal assemblies proximate the motor hub, according to one illustrated embodiment.

FIG. 10 shows a partial disk drive 1000 including the motor hub 102 having two disks 1002a, b (collectively 1002) supported by the lower mounting surface 202, and an HSA 1004. FIG. 11 is a magnified, cross-sectional, side view of the motor hub 102 and disks 1002, with HGAs 1006a-d (collectively 1006) removed for clarity. FIG. 12 is a magnified, cross-sectional side view of the motor hub 102 and disks 1002 with the HGAs 1006 positioned proximate to the motor hub 102. As illustrated, in one embodiment, the disk drive 1000 may include the motor hub 102 and may further include a disk 1002a physically contacting and supported by the lower mounting surface 202, and a head 1008 operable to write to and read from the disk 1002a.

In some embodiments, a plurality of disks 1002 may be supported by the lower mounting surface 202. As illustrated, a stepped disk spacer 1010 may be incorporated into the disk drive 1000 in order to properly separate proximately positioned disks 1002, and a disk clamp 1012 may be used to couple the disks 1002 to the motor hub 102. The stepped disk spacer 1010 is shown in FIG. 11 to be in contact with the motor hub 102. In other embodiments, more or fewer disks 1002 may be supported by the lower mounting surface 202. For example, a single disk may be supported by the lower mounting surface, and a taller disk spacer may be incorporated into the disk drive to take up the space that might otherwise be occupied by additional disks.

In the embodiment of FIG. 11, the stepped disk spacer 1010 includes a step 1111 having a step diameter that is shown to be substantially less than a greatest outer diameter of the stepped disk spacer 1010. The diameter of the step 1111 is also shown in FIG. 11 to be approximately equal to that of the middle cylindrical portion 110 of the motor hub 102. An inner radial extent of the disk 1002a is shown in FIG. 11 to abut the step 1111 of the stepped disk spacer 1010. Likewise, an inner radial extent of the disk 1002b is shown in FIG. 11 to abut another step in the stepped disk spacer 1010. Also, an inner radial extent of the disk 1002a is shown in FIG. 11 to abut the middle cylindrical portion 110 of the motor hub 102.

Figure 13:
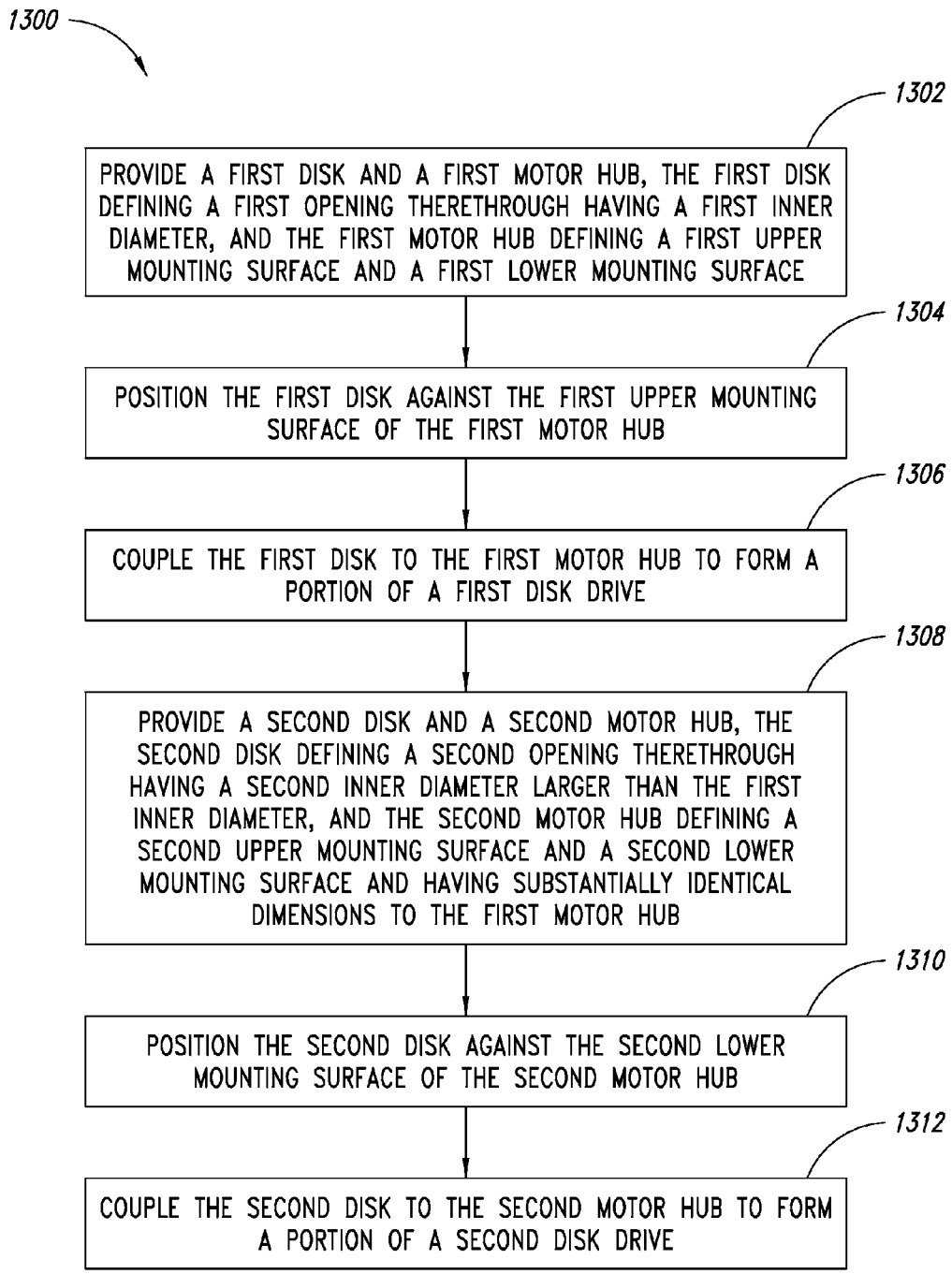
FIG. 13 illustrates a flow chart for a method of manufacturing a plurality of disk drives, according to one illustrated embodiment.

FIG. 13 illustrates a flow chart for a method 1300 of manufacturing a plurality of disk drives, according to one illustrated embodiment. This method 1300 will be discussed in the context of the motor hub 102 of FIGS. 1-12, and particularly in terms of the two disk drives 700, 1000 illustrated in FIGS. 7-12. However, the acts disclosed herein may be executed using a variety of different disk drive motor hubs, in accordance with the described method.

As described herein, at least some of the acts comprising the method 1300 may be orchestrated by a processor according to an automatic disk drive manufacturing algorithm, based at least in part on computer-readable instructions stored in computer-readable memory and executable by the processor. A manual implementation of one or more acts of the method 1300 may also be employed, in other embodiments.

At act 1302, a first disk 702a and a first motor hub 102 are provided, the first disk 702a defining a first opening therethrough having a first inner diameter, and the first motor hub 102 defining a first upper mounting surface 200 and a first lower mounting surface 202. The first disk 702a may be formed in a variety of ways. In one embodiment, the media of the first disk 702a may be formed, and then the first disk 702a may be stamped or otherwise machined to define the first opening.

The first motor hub 102 may also be formed in a variety of ways. In one embodiment, the first motor hub 102 may be machined to form the first upper mounting surface 200 and the first lower mounting surface 202. In other embodiments, the first motor hub 102 may be cast, molded or machined to form the first upper mounting surface 200 and the first lower mounting surface 202. In still other embodiments, other manufacturing techniques may be employed.

At act 1304, the first disk 702a is positioned against the first upper mounting surface 200 of the first motor hub 102. As most easily seen in FIG. 8, the first disk 702a may be positioned in physical contact with the first upper mounting surface 200. In one embodiment, a machine vision system may help align the first disk 702a and the first upper mounting surface 200, before the first disk 702a is placed into position using a robotic end effector.

At act 1306, the first disk 702a is coupled to the first motor hub 102 to form a portion of a first disk drive 700. The first disk 702a may be coupled to the first motor hub 102 in a variety of ways. In one embodiment, a disk clamp 712 may be used to secure the first disk 702a against the first motor hub 102. In other embodiments, other structures for coupling these components may be used.

In other embodiments, more disks may be positioned against and coupled to the first motor hub 102 to form the first disk drive 700. For example, as illustrated, the first disk drive 700 may include the two disks 702a, b illustrated in FIGS. 7-9.

At act 1308, a second disk 1002a and a second motor hub 102 are provided, the second disk 1002a defining a second opening therethrough having a second inner diameter larger than the first inner diameter, and the second motor hub 102 defining a second upper mounting surface 200 and a second lower mounting surface 202 and having substantially identical dimensions to the first motor hub 102. The same numbering is used herein to describe the second motor hub 102 because it has physical dimensions that are substantially identical to that of the first motor hub 102. However, it may be understood that these two motor hubs represent different physical embodiments of the same type of motor hub.

The second disk 1002a may have any of a variety of second inner diameters larger than the first inner diameter of the first disk 702a. In one embodiment, the second disk 1002a may have a second inner diameter that is larger than the first inner diameter by more than a manufacturing tolerance for the first disk 702a. For example, the second inner diameter may be more than 2 mm greater than the first inner diameter.

At act 1310, the second disk 1002a is positioned against the second lower mounting surface 202 of the second motor hub 102. As most easily seen in FIG. 11, the second disk 1002a may be positioned in physical contact with the second lower mounting surface 202. In one embodiment, a machine vision system may help align the second disk 1002a and the second lower mounting surface 202, before the first disk 1002a is placed into position using a robotic end effector.

At act 1312, the second disk 1002a is coupled to the second motor hub 102 to form a portion of a second disk drive 1000. The second disk 1002a may be coupled to the second motor hub 102 in a variety of ways. In one embodiment, a disk clamp 1012 may be used to secure the second disk 1002a against the second motor hub 102. In other embodiments, other structures for coupling these components may be used.

In other embodiments, more disks may be positioned against and coupled to the second motor hub 102 to form the second disk drive 1000. For example, as illustrated, the second disk drive 1000 may include the two disks 1002a, b illustrated in FIGS. 10-12.

Thus, in one embodiment, the first disk drive 700 may comprise a disk drive from a first disk drive program, while the second disk drive 1000 may comprise a disk drive made according to a second disk drive program, and yet both of these disk drives may be manufactured using a common motor hub design.

The foregoing detailed description has set forth various embodiments of the devices and/or processes via the use of block diagrams, schematics, and examples.

Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

We claim:

1. A motor hub comprising:
   a top cylindrical portion defining a longitudinal axis;
   a middle cylindrical portion proximate the top cylindrical portion, the middle cylindrical portion defining an upper mounting surface substantially normal to the longitudinal axis, the upper mounting surface extending radially beyond the top cylindrical portion, the top cylindrical portion contacting an inner diameter of a first disk when the motor hub is in use in a first configuration; and
   a bottom cylindrical portion proximate the middle cylindrical portion, the bottom cylindrical portion defining a lower mounting surface substantially normal to the longitudinal axis, the lower mounting surface extending radially beyond the middle cylindrical portion, the middle cylindrical portion contacting an inner diameter of a second disk when the motor hub is in use in a second configuration.

2. The motor hub of claim 1, wherein the middle cylindrical portion extends longitudinally relative to the lower mounting surface, and the top cylindrical portion extends longitudinally relative to the upper mounting surface.

3. The motor hub of claim 1, wherein a height of the middle cylindrical portion measured along the longitudinal axis is greater than or equal to 0.5 mm.

4. The motor hub of claim 1, wherein a diameter of the top cylindrical portion is greater than or equal to approximately 20 mm.

5. The motor hub of claim 1, wherein the inner diameter of the second disk is greater than the inner diameter of the first disk.

6. A disk drive including the motor hub of claim 1,
   wherein the disk drive includes the first disk and wherein the first disk is physically contacting and supported by the upper mounting surface; and
   wherein the disk drive further includes a head operable to write to and read from the first disk.

7. A disk drive including the motor hub of claim 1,
   wherein the disk drive includes the second disk and wherein the second disk is physically contacting and supported by the lower mounting surface; and
   wherein the disk drive further includes a head operable to write to and read from the second disk.

8. The disk drive of claim 7, further comprising a stepped disk spacer in contact with the motor hub, the stepped disk spacer including a step having a step diameter that is substantially less than a greatest outer diameter of the stepped disk spacer, and wherein the inner diameter of the second disk abuts the step of the stepped disk spacer.

9. The disk drive of claim 8, wherein the step diameter is approximately equal to that of the middle cylindrical portion of the motor hub.

10. A motor hub comprising a stepped cylindrical hub defining a longitudinal axis, the stepped cylindrical hub including:
    a first step extending radially to define an upper mounting surface substantially normal to the longitudinal axis, the upper mounting surface constructed to contact a first disk having a first inner diameter; and
    a second step extending radially beyond the first step to define a lower mounting surface substantially normal to the longitudinal axis, the lower mounting surface constructed to contact a second disk having a second inner diameter.

11. The motor hub of claim 10, wherein a height of the first step measured along the longitudinal axis is greater than or equal to 0.5 mm.

12. The motor hub of claim 10, wherein the second inner diameter of the second disk is greater than the first inner diameter of the first disk.

13. A disk drive including the motor hub of claim 10,
   wherein the disk drive includes the first disk and wherein the first disk is physically contacting and supported by the upper mounting surface; and
   wherein the disk drive further includes a head operable to write to and read from the first disk.

14. A disk drive including the motor hub of claim 10,
   wherein the disk drive includes the second disk and wherein the second disk is physically contacting and supported by the upper mounting surface; and
   wherein the disk drive further includes a head operable to write to and read from the second disk.

15. The disk drive of claim 14, further comprising a stepped disk spacer in contact with the motor hub, the stepped disk spacer including a step having a step diameter that is substantially less than a greatest outer diameter of the stepped disk spacer, and wherein the second inner diameter of the second disk abuts the step of the stepped disk spacer.

16. The disk drive of claim 14, further comprising a stepped disk spacer in contact with the motor hub, the stepped disk spacer including two steps, each step having a step diameter that is substantially less than a greatest outer diameter of the stepped disk spacer, and wherein the second inner diameter of the second disk abuts at least one of the two steps.

17. A method of manufacturing a plurality of disk drives, the method comprising:
   providing a first disk and a first motor hub, the first disk defining a first opening therethrough having a first inner diameter, and the first motor hub defining a first upper mounting surface and a first lower mounting surface;
   positioning the first disk against the first upper mounting surface of the first motor hub;
   coupling the first disk to the first motor hub to form a portion of a first disk drive;
   providing a second disk and a second motor hub, the second disk defining a second opening therethrough having a second inner diameter larger than the first inner diameter, and the second motor hub defining a second upper mounting surface and a second lower mounting surface and having substantially identical dimensions to the first motor hub;
   positioning the second disk against the second lower mounting surface of the second motor hub; and
   coupling the second disk to the second motor hub to form a portion of a second disk drive.

18. The method of claim 17, wherein positioning the first disk against the first upper mounting surface of the first motor hub includes positioning the first disk such that at least a portion of a head gimbal assembly of the first disk drive is dimensioned to fit between the first disk and the first lower mounting surface.

* * * * *